(12) United States Patent
Liang

(10) Patent No.: US 7,597,533 B1
(45) Date of Patent: Oct. 6, 2009

(54) BOAS WITH MULTI-METERING DIFFUSION COOLING

(75) Inventor: George Liang, Palm City, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 513 days.

(21) Appl. No.: 11/698,379

(22) Filed: Jan. 26, 2007

(51) Int. Cl.
*F01D 5/18* (2006.01)
(52) U.S. Cl. .................. 415/116; 415/173.1; 415/173.4; 415/176; 415/178
(58) Field of Classification Search ................. 415/115, 415/116, 173.1, 173.4, 176, 178, 200
See application file for complete search history.

(56) References Cited

U.S. PATENT DOCUMENTS

| | | | |
|---|---|---|---|
| 4,573,865 A | 3/1986 | Hsia et al. | |
| 4,679,981 A | 7/1987 | Guibert et al. | |
| 5,375,973 A | 12/1994 | Sloop et al. | |
| 5,423,659 A | 6/1995 | Thompson | |
| 5,538,393 A * | 7/1996 | Thompson et al. | 415/115 |
| 5,601,402 A | 2/1997 | Wakeman et al. | |
| 5,772,400 A | 6/1998 | Pellow | |
| 5,964,575 A | 10/1999 | Marey | |
| 6,126,389 A | 10/2000 | Burdgick | |
| 6,508,623 B1 | 1/2003 | Shiozaki et al. | |
| 6,617,003 B1 * | 9/2003 | Lee et al. | 428/131 |
| 6,659,716 B1 | 12/2003 | Laurello et al. | |
| 6,666,645 B1 | 12/2003 | Arilla et al. | |
| 6,726,446 B2 | 4/2004 | Arilla et al. | |
| 6,877,952 B2 | 4/2005 | Wilson | |
| 6,899,518 B2 | 5/2005 | Lucas et al. | |
| 6,905,302 B2 * | 6/2005 | Lee et al. | 415/115 |
| 7,033,138 B2 * | 4/2006 | Tomita et al. | 415/139 |

\* cited by examiner

*Primary Examiner*—Igor Kershteyn
(74) *Attorney, Agent, or Firm*—John Ryznic

(57) ABSTRACT

A blade outer air seal used in a gas turbine engine, the BOAS including a metering plate with metering holes and an impingement plate with impingement holes, the metering plate and impingement plate forming a plurality of separate diffusion cavities forming a grid. A porous metallic plate is bonded to the underside of the impingement plate and has a plurality of cooling channels extending from the leading edge to the trailing edge of the BOAS. Cooling air from the blade ring carrier is metered through the metering holes and into the diffusion cavities, and then passes through a plurality of impingement holes and into a cooling channel, to be discharged out the trailing edge side of the BOAS. Inter-segment cooling holes also pass cooling air out to the sides of the BOAS.

20 Claims, 2 Drawing Sheets

View A-A

View A-A

US 7,597,533 B1

BOAS WITH MULTI-METERING DIFFUSION COOLING

BACKGROUND OF THE INVENTION

1. Field of the Invention

The present invention relates generally to a gas turbine engine, and more specifically to a blade outer air seal and its cooling.

2. Description of the Related Art Including Information Disclosed Under 37 CFR 1.97 and 1.98

In an axial flow gas turbine engine, a compressor provides compressed air to a combustor where a fuel is mixed with the compressed air to produce an extremely high temperature gas flow, the resulting hot gas flow being passed through a multiple stage turbine to produce power that drives the turbine rotor shaft. In an aero engine used to power an aircraft, the turbine is used mainly to drive the compressor and an optional fan blade to propel the aircraft. In an industrial gas turbine engine, as much of the hot gas flow is used to drive the turbine in order to convert as much of the chemical energy from the combustion into mechanical work that is used to drive an electric generator.

The turbine section of the engine includes a plurality of stages of rotor blades that convert the hot gas flow into mechanical energy that drives the turbine shaft. The rotor blades rotate within the engine and form a gap between the blade tip and an outer shroud on the engine casing. The blade tip gap will allow for hot gas flow to leak through the turbine, and therefore a loss of energy is produced. The blade tip gap will change depending upon the outer shroud and blade temperatures. Limiting the gap space such that a hot gas flow leakage is minimized will improve the efficiency of the engine.

In the prior art, blade outer air seals (or, BOAS) have been proposed to limit the blade tip gap formed between the blade tip and the outer shroud. The outer shroud seal is formed from a plurality of arcuate shroud segments forming an annular arranged on the stator assembly that encircles the rotor blades. Thermal barrier coatings (TBC) have also been added to the shroud segment surfaces to limit thermal damage to the BOAS since the hot gas flow leakage will affect the blade tip and the shroud segment material.

One problem found with arcuate shroud segments that have a TBC applied thereto is the stresses developed between the TBC and the substrate on which the TBC is applied. When the engine is cold, no stress is developed between the TBC and the substrate of the arcuate shroud segment because the TBC was applied in the cold condition. When the engine is operating and the shroud segments reach normal operating temperatures, the shroud segments tend to bend due to thermal growth. Mismatch between the coefficients of thermal expansion between the TBC and the shroud segment will induce high stresses between the materials and cause spalling of the TBC.

One prior art reference that attempts to address this problem is U.S. Pat. No. 5,375,973 issued to Sloop et al on Dec. 27, 1994 entitled TURBINE BLADE OUTER AIR SEAL WITH OPTIMIZED COOLING in which the BOAS shroud segment includes first and second groups of cooling passages each with a cooling air supply orifice to supply cooling air from the casing cavity, one or more re-supply holes connecting the cooling passages to the cavity to re-supply cooling air, and cross supply orifices connecting adjacent cooling passages to provide for cross flow of cooling air between the cooling passages in the event that the flow within a particular passage shroud decrease, as in the case where the metering orifice of a cooling passage is partially obstructed by a foreign object (see column 6, lines 25-34 in the Sloop et al patent). The Sloop et al patent provides improved BOAS cooling over the cited prior art. However, the present invention improves over the Sloop et al cooling design by providing for multi-metering diffusion compartment cooling to provide improved cooling using less cooling air.

BRIEF SUMMARY OF THE INVENTION

The present invention is a blade outer air seal (BOAS) used in a gas turbine engine in which the shroud segments include multi-metering diffusion compartments for cooling the BOAS and a float wall mechanism for the entire blade outer air seal. The BOAS shroud segment includes a plurality of diffusion cavities extending in a direction to the hot gas flow path each with metering holes to meter cooling air from the blade ring carrier. Each diffusion cavity is connected to a plurality of cooling channels also extending along the direction of the flow path. The TBC is applied to the outer surface of the shroud segment with a wire mesh to limit spalling. The combined effect of both mechanisms greatly reduces the BOAS main body metal temperature and improves the durability of the thermal barrier coating (TBC) which results in a reduction of cooling flow requirement, improves the turbine stage performance, and prolongs the BOAS life.

DETAILED DESCRIPTION OF THE INVENTION

Figure 1:
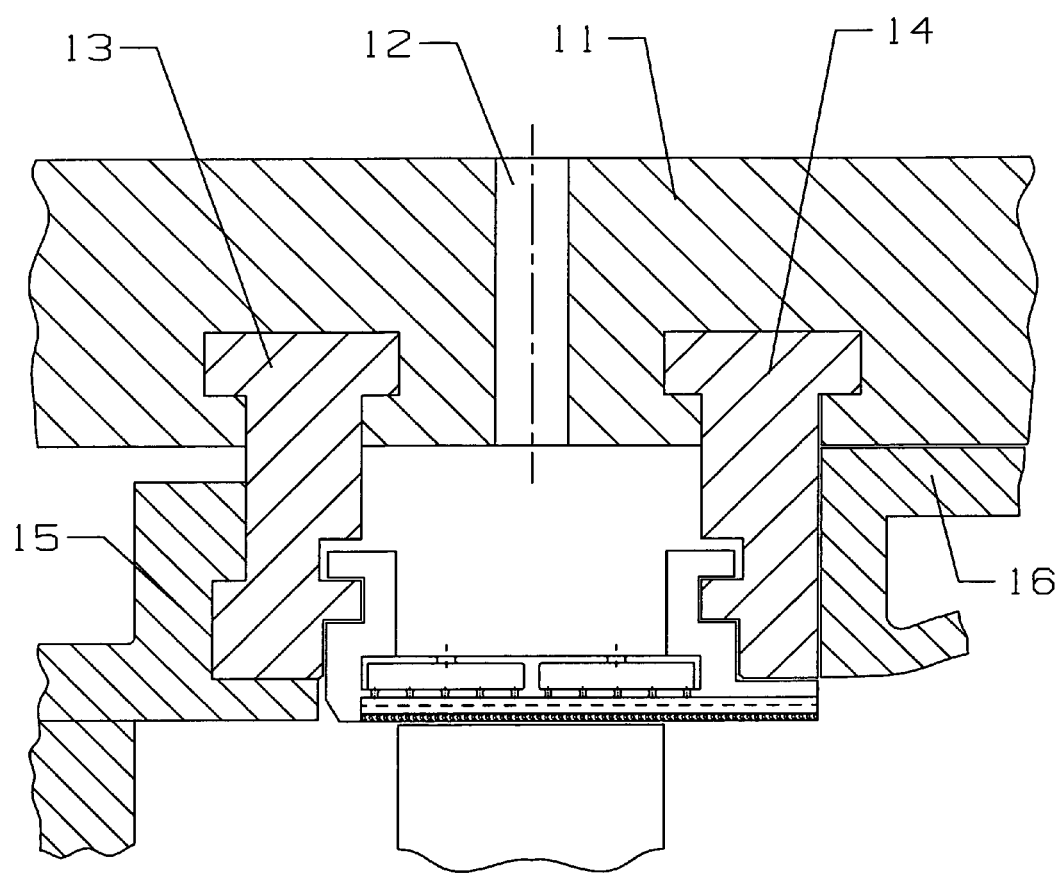
FIG. 1 shows a cross sectional view of a floating wall cooled BOAS of the present invention.

The BOAS of the present invention is represented in FIG. 1 and includes a blade ring carrier 11, a cooling air supply hole 12 in the carrier 11, a forward carrier or isolation ring 13 and an aft carrier or isolation ring 14, an upstream vane assembly 15 and a downstream vane assembly 16, and a BOAS assembly 20 secured between the two isolation rings 13 and 14 as is typical in the prior art BOAS assemblies. A cooling air cavity is formed between the blade ring carrier 11, the two isolation rings 13 and 14, and the top surface of the BOAS assembly 20 in which the cooling supply hole 12 supplies the pressurized cooling air for the BOAS.

Figure 2:
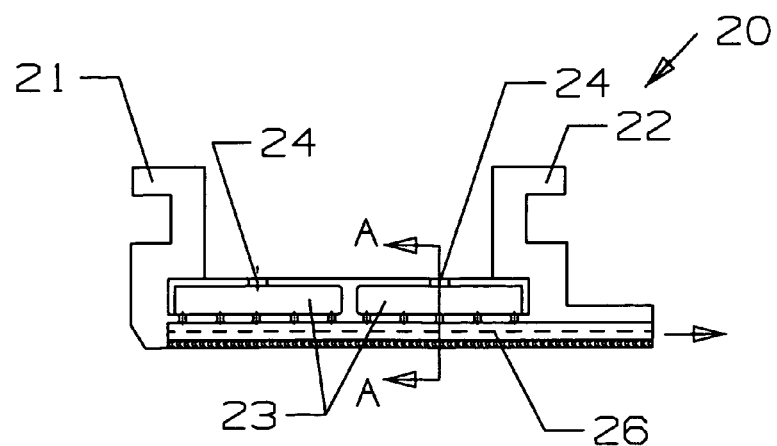
FIG. 2 shows a cross sectional view of a detailed view of the BOAS of the present invention.

FIG. 2 shows a separate view of the BOAS assembly from FIG. 1 with the ring carrier hooks including a forward or leading edge hook 21 and an aft or trailing edge hook 22. FIG. 2 shows the BOAS assembly 20 with the leading edge on the left and the trailing edge on the right of the figure. The BOAS includes two diffusion cavities 23 that extend circumferentially from one end to the other of the shroud segment. Each of the two diffusion cavities 23 is connected to the cooling air supply cavity by a metering hole 24.

Figure 3:
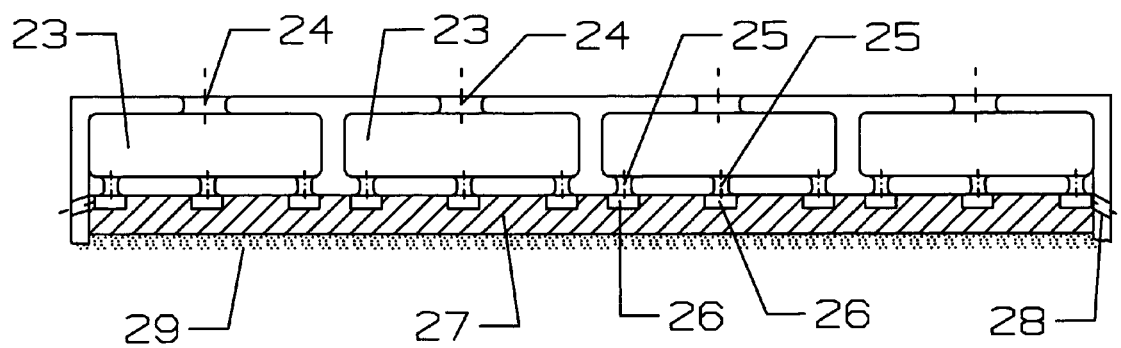
FIG. 3 shows a view of the BOAS through a cut as represented in FIG. 2.

FIG. 3 shows a different view of the BOAS of FIG. 2 looking in the direction of the arrows in FIG. 2. This direction would be from the trailing edge looking along the direction of flow toward the leading edge. Each of the diffusion cavities 23 in FIG. 2 is formed into four separate diffusion cavities 23 in FIG. 3, each with a metering hole 24 connecting the cooling supply cavity to the diffusion holes 23. The BOAS assembly 20 is formed from a metering plate 31 that is welded onto the stiffener rib plate 32 that forms the diffusion cavities 23. The stiffener rib plate 32 includes a bottom with the impingement holes 25. An inter-metallic layer 27 secured to the bottom of the BOAS includes a plurality of cooling channels extending from the leading edge to the trailing edge. The inter-metallic layer is a porous fiber metal pad that has the cooling channels 26 machined into the upper surface of the pad. The porous fiber metallic pad 27 is TLP bonded to the impingement hole substrate of the stiffener rib plate 32. Each cooling channel 26 is connected to the diffusion cavity 23 through a plurality of impingement holes 25 as seen in FIG. 3. The cooling channels extend from the leading edge of the BOAS and open onto the outer side of the trailing edge of the BOAS as seen in FIG. 2. The channels are closed on the leading edge and open on the trailing edge. The cooling air impinged into the channels flow out from the BOAS and discharged at the trailing edge or trailing edge as seen in FIG. 2. The outer sides of the BOAS shroud segment includes inter-segment cooling holes 28 connected to the cooling channels 26 on the ends of the shroud segments. A thick TBC layer 29 is applied to the bottom of the inter-metallic layer 27 with a wire mesh to provide added stiffness and strength. In the case when a piece of the TBC breaks away from the BOAS (spallation), the exposed opening in the porous fiber metal pad will allow for the cooling air to pass through the newly opened hole by forming a cooling passage for inducing transpiration cooling around the opening.

Stiffener ribs 31 are used on the back side of the BOAS backing substrate to transform the BOAS into a grid panel configuration. The stiffener ribs 31 also separate the diffusion cavities 23 from each other. A metering plate (part with the impingement holes 25) is then welded onto the stiffener ribs 31 to transform the grid panel into multiple compartments. Impingement holes 25 at various size and number are utilized in the BOAS substrate corresponding to each individual compartment. A low porosity and low modulus inter-metallic fiber metal pad 27 is bonded onto the hot side of the BOAS substrate. A thermal barrier coating (TBC) 29 is applied onto the external surface of the fiber metal pad material 27. The roughness of the fiber metal pad 27 surface also provides additional grabbing strength for the TBC 29. The interlayer fiber metal pad 27 between the TBC 29 and the BOAS backing structure functions as a strain isolator to compensate for the thermal expansion mismatch between the TBC and the backing substrate material. In addition, it allows for the TBC layer to distort to a stress free geometry and yields a float wall type of structure. Since the fiber metal pad 27 is made of porous metal wires, it acts as a good thermal insulator to the backing substrate and allows for a large temperature drop across the fiber metal pad.

Cooling channels 26 are built into the inner portion of the fiber metal pad 27 corresponding to the backside impingement cooling holes on the BOAS backing substrate of each compartment. The cooling channels 26 can be at formation of parallel or criss-cross to each other depending on the impingement hole pattern.

In operation, cooling air is supplied through the blade ring carrier. The cooling air is then metered through the metering plate and diffused into the compartment cavity. The amount of cooling air for each individual compartment is sized based on the local gas side heat load and pressure which therefore regulates the local cooling performance and metal temperature. The cooling air is then metered through the substrate backing material, impinging onto the backside of the fiber metal pad, diffusing in each of the built-in channels in the compliant layer. With the BOAS cooling arrangement of the present invention, a maximum usage of cooling air for a given airfoil inlet gas temperature and pressure profile is achieved. Also, cooling air is metered twice in each of the small individual diffusion compartments to allow for the cooling air to be uniformly distributed into a cooling channel in the compliant layer, which achieves a uniform heat pick-up in the porous material and controls the amount of cooling air to be discharged at various locations of the BOAS. The spent cooling air is finally discharged at the trailing edge of the BOAS out the opening of the channel on the suction or trailing edge side of the BOAS. Optimum cooling flow utilization is achieved with the BOAS cooling arrangement of the present invention. in the event that a piece of the TBC breaks off (spalling), the resulting hole or opening would allow for the cooling air in the channel to pass through the opening and induce transpiration cooling around the spallation.

I claim the following:

1. A blade outer air seal for use in a gas turbine engine, the blade outer air seal comprising:
   a plurality of diffusion cavities each having a metering hole in fluid communication with a cooling air supply;
   an impingement hole plate having a plurality of impingement holes in fluid communication with the diffusion cavities;
   a porous metallic plate having a plurality of cooling channels formed therein; and,
   a thermal barrier coating applied to the outer surface of the porous metallic plate; wherein cooling air passes through the metering holes and into the diffusion cavities, and then through at least one of the impingement holes and into the cooling channel to provide cooling to the blade outer air seal.

2. The blade outer air seal of claim 1, and further comprising:
   the cooling channels in the porous metallic plate extend substantially in a direction of the hot gas flow through the turbine; and,
   each channel includes a plurality of impingement holes in fluid communication with a diffusion cavity.

3. The blade outer air seal of claim 1, and further comprising:
   a plurality of diffusion cavities forming a compartment of cavities, each compartment diffusion cavity being separated from other compartment cavities by stiffener ribs.

4. The blade outer air seal of claim 3, and further comprising:
   two compartment cavities extend from the leading edge to the trailing edge of the blade outer air seal; and,
   four compartment cavities extend from side to side of the blade outer air seal.

5. The blade outer air seal of claim 1, and further comprising:
   each of the sides of the blade outer air seal includes a plurality of inter-segment cooling holes in fluid communication with the outer-most cooling channels to discharge cooling air from the blade outer air seal and onto an adjacent blade outer air seal.

6. The blade outer air seal of claim 1, and further comprising:
   the porous metallic plate is porous enough to allow for cooling air from the channel to flow through the porous metal and out through a hole resulting from a spallation occurring in the TBC.

7. The blade outer air seal of claim 2, and further comprising:
   a plurality of diffusion cavities forming a compartment of cavities, each compartment diffusion cavity being separated from other compartment cavities by stiffener ribs.

8. The blade outer air seal of claim 7, and further comprising:
two compartment cavities extend from the leading edge to the trailing edge of the blade outer air seal; and,
four compartment cavities extend from side to side of the blade outer air seal.

9. The blade outer air seal of claim 3, and further comprising:
each of the sides of the blade outer air seal includes a plurality of inter-segment cooling holes in fluid communication with the outer-most cooling channels to discharge cooling air from the blade outer air seal and onto an adjacent blade outer air seal.

10. The blade outer air seal of claim 8, and further comprising:
the porous metallic plate is porous enough to allow for cooling air from the channel to flow through the porous metal and out through a hole resulting from a spallation occurring in the TBC.

11. A gas turbine engine having a turbine section with at least one stage of rotor blades, each blade having a blade tip that forms a gap with a blade outer air seal secured to a stationary casing, the blade outer air seal comprising:
a metering cover plate having a plurality of metering holes therein;
an impingement and stiffener rib plate having a plurality of impingement holes therein;
the metering cover plate and the impingement and stiffener plate forming a plurality of diffusion cavities;
a porous metallic plate having a plurality of cooling channels, the porous metallic plate being secured to the impingement plate such that the impingement holes are aligned with the cooling channels; and,
a TBC applied on the porous metallic plate on the side opposite to the cooling channels.

12. The gas turbine engine of claim 11, and further comprising:
the plurality of diffusion cavities are formed as separate compartment cavities such that a plurality of compartment cavities extend along the blade outer air seal in a direction parallel to the flow through the turbine and a plurality of compartment cavities extend along the blade outer air seal in a direction normal to the flow through the turbine; and,
each compartment cavity being separated from other cavities and in fluid communication to a cooling air supply though a single metering hole.

13. The gas turbine engine of claim 12, and further comprising:
the cooling channels in the porous metallic plate extend in a direction substantially parallel top the gas flow through the turbine.

14. The gas turbine engine of claim 13, and further comprising:
each of the compartment cavities includes a plurality of impingement holes in fluid communication with a cooling channel.

15. The gas turbine engine of claim 11, and further comprising:
the porous metallic plate is of such porosity that when a piece of the TBC spalls off and leaves an opening, cooling air from the cooling channel flows out through the opening to provide transpiration cooling to the TBC.

16. The gas turbine engine of claim 14, and further comprising:
each of the two sides of the blade outer air seal includes a plurality of inter-segment cooling holes in fluid communication with the outer-most cooling channel to provide cooling to the side of the blade outer air seal.

17. A process for cooling a blade outer air seal used in a gas turbine engine, the process comprising the steps of:
supplying compressed cooling air to a blade ring carrier of the engine;
metering the cooling air into a plurality of separate diffusion cavities formed within the blade out air seal;
impinging cooling from the diffusion cavities into cooling channels extending along the blade outer air seal; and,
discharging the cooling air from the cooling channels out the trailing edge side of the blade outer air seal.

18. The process for cooling a blade outer air seal of claim 17, and further comprising the step of:
metering the cooling air into a plurality of diffusion compartments extending in both directions of the blade air outer seal.

19. The process for cooling a blade outer air seal of claim 18, and further comprising the step of:
channeling the cooling air through the cooling channels in a direction along the blade outer air seal from the leading edge to the trailing edge.

20. The process for cooling a blade outer air seal of claim 19, and further comprising the step of:
passing cooling air from the individual compartment cavities through a plurality of impingement holes into the cooling channels such that cooling air through one metering hole flows through a plurality of impingement holes and into a single cooling channel.

* * * * *